(12) United States Patent
Propheter-Hinckley et al.

(10) Patent No.: US 8,251,651 B2
(45) Date of Patent: Aug. 28, 2012

(54) SEGMENTED CERAMIC MATRIX COMPOSITE TURBINE AIRFOIL COMPONENT

(75) Inventors: Tracy A. Propheter-Hinckley, Manchester, CT (US); Jun Shi, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 884 days.

(21) Appl. No.: 12/361,192

(22) Filed: Jan. 28, 2009

(65) Prior Publication Data

US 2010/0189556 A1 Jul. 29, 2010

(51) Int. Cl.
*F01D 9/02* (2006.01)
(52) U.S. Cl. .................................................... 415/200
(58) Field of Classification Search ............... 415/200, 415/209.3, 209.2, 115, 1; 416/241 B, 232, 416/193 A
See application file for complete search history.

(56) References Cited

U.S. PATENT DOCUMENTS

| | | | |
|---|---|---|---|
| 3,301,526 A | 1/1967 | Chamberlain | |
| 3,515,499 A | 6/1970 | Beer et al. | |
| 3,761,200 A | 9/1973 | Gardiner | |
| 3,781,130 A * | 12/1973 | Tall | 416/97 R |
| 3,872,563 A | 3/1975 | Brown et al. | |
| 4,203,706 A | 5/1980 | Hess | |
| 4,347,037 A | 8/1982 | Corrigan | |
| 5,244,345 A | 9/1993 | Curtis | |
| 5,616,001 A * | 4/1997 | Boyd | 415/209.2 |
| 6,193,141 B1 | 2/2001 | Burke et al. | |
| 6,197,424 B1 | 3/2001 | Morrison et al. | |
| 6,200,092 B1 | 3/2001 | Koschier | |
| 6,277,440 B1 | 8/2001 | Reynolds | |
| 6,322,322 B1 | 11/2001 | Rhodes et al. | |
| 6,648,597 B1 | 11/2003 | Widrig et al. | |
| 6,696,144 B2 | 2/2004 | Holowczak et al. | |
| 6,709,230 B2 | 3/2004 | Morrison et al. | |
| 7,153,096 B2 | 12/2006 | Thompson et al. | |
| 7,247,002 B2 | 7/2007 | Albrecht et al. | |
| 7,247,003 B2 | 7/2007 | Burke et al. | |
| 7,255,535 B2 | 8/2007 | Albrecht et al. | |
| 7,258,530 B2 * | 8/2007 | Morrison et al. | 416/232 |
| 7,284,958 B2 | 10/2007 | Dundas et al. | |
| 7,316,539 B2 | 1/2008 | Campbell | |
| 7,753,643 B2 * | 7/2010 | Gonzalez et al. | 415/1 |
| 2007/0258811 A1 | 11/2007 | Shi et al. | |

FOREIGN PATENT DOCUMENTS

EP 1683771 A1 7/2006

* cited by examiner

*Primary Examiner* — Alexander Gilman
(74) *Attorney, Agent, or Firm* — Kinney & Lange, P.A.

(57) ABSTRACT

A segmented component for use with a gas turbine engine comprises a radially extending gas path portion. The gas path portion is for interacting with gas flow from the gas turbine engine. The component is divided into axially aligned segments comprising a forward segment, an aft segment, and a plurality of middle segments disposed between the forward segment and the aft segment. The middle segments comprise radially elongate ceramic matrix composite material plates. In one embodiment, the gas path portion comprises an airfoil for a turbine blade. In another embodiment, the gas path portion comprises a removable platform for a turbine blade. In another embodiment, the gas path portion comprises an airfoil for a turbine vane.

14 Claims, 8 Drawing Sheets

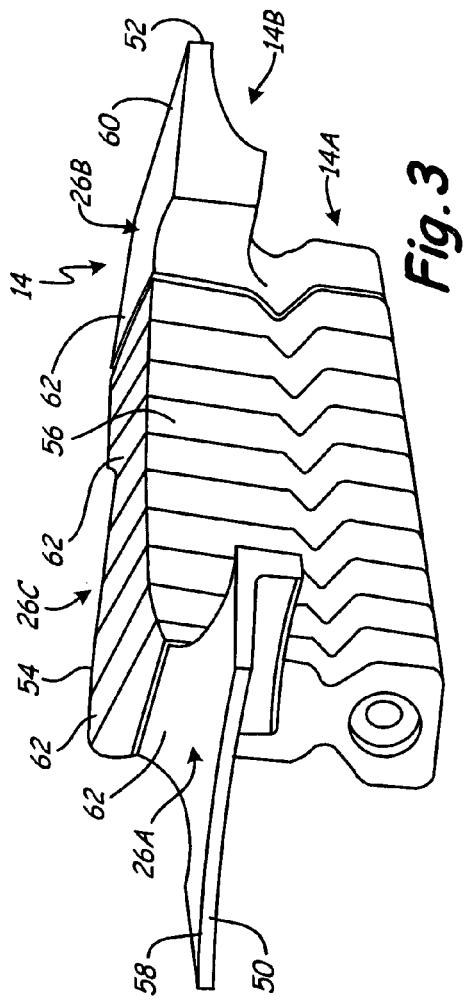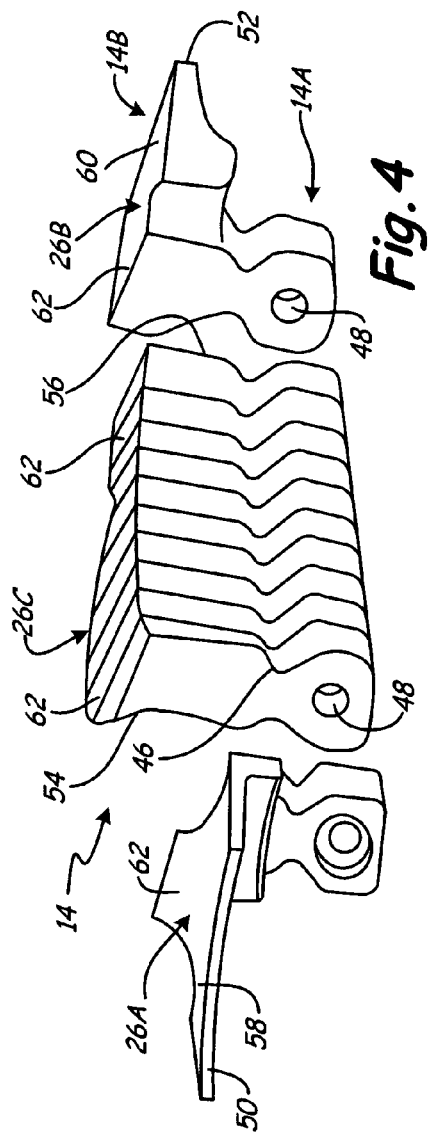

SEGMENTED CERAMIC MATRIX COMPOSITE TURBINE AIRFOIL COMPONENT

BACKGROUND

The present invention is directed to airfoil components for gas turbine engines and, more particularly, to ceramic matrix composite turbine blades, vanes and platforms.

Gas turbine engines comprise one or more rotating turbines that are used to extract energy from a high velocity and high temperature gas flow produced within the gas turbine engine. The turbines are comprised of a plurality of radially extending airfoil blades that are connected at their inner diameter ends to a rotor, which is connected to a shaft that rotates within the engine as the blades interact with the gas flow. The rotor typically comprises a disk having a plurality of axial retention slots that receive mating root portions of the blades to prevent radial dislodgment. Blades typically also include integral inner diameter platforms that prevent the high temperature gases from escaping through the radial retention slots. Between the turbine blades are disposed a plurality of radially extending stationary airfoil vanes, which are typically supported by inner and outer diameter shrouds that are suspended from an outer engine case and supported by an inner structure, respectively. During operation of the engine, the turbine blades and vanes are subjected to high heat from the gas. Additionally, the blades are subjected to high stresses from rotational forces. It is, therefore, a constant design challenge to develop materials for turbine blades and vanes that are more heat resistant to reduce cooling demands, and lighter to increase propulsive efficiencies in aircraft engines.

Typically, turbine blades and vanes are fabricated from high strength alloys as single pieces, with integral roots, platforms and shrouds. More recent turbine blade designs have attempted to incorporate ceramic matrix composite (CMC) materials, which are lightweight, heat resistant and strong. CMC material comprises a ceramic fabric that is infused with a liquid ceramic matrix. The ceramic fabric is preformed to a desired shape and the matrix solidifies within the fabric to produce a part having the lightweight and heat resistance characteristics of the matrix and the strength characteristics of the fabric. Production of thick CMC material parts is constrained because of manufacturing limitations in infusing the liquid matrix into deep layering of the preformed fabric. Inadequately infused liquid matrix produces porosity within the component that limits the heat transfer capabilities within the matrix and provides an initiation point for crack propagation. Furthermore, due to the two-dimensional nature of the ceramic fabric, difficulties arise in producing parts having complex three-dimensional shapes. For example, it is difficult to produce CMC material turbine blades having both a radially extending airfoil component and an axially extending platform component.

It is, however, desirable to use CMC material despite these complexities, as CMC materials weigh approximately one third of the weight of typical metal alloys used for turbine components, while having much higher temperature limitations. As such, production methods have been developed that attempt to overcome the aforementioned manufacturing issues. However, previous attempts at producing CMC material components have resulted in complex designs that limit the benefits of using CMC material in turbine blades. For example, one method of producing a vane involves radially stacking numerous layers of CMC material in a radial direction to obtain an airfoil shape. The stack is compressed with mechanical tensioning means to obtain the desired tensile strength and to prevent the layers from separating. Such a vane design is impractical for turbine blades because the stack extends radially in the direction in which severe stresses are generated within a rotating turbine blade. Furthermore, the mechanical tensioning means typically comprises threaded fasteners fabricated from an alloy that requires cooling, thus limiting the temperature benefits of using CMC material in a hot section of a gas turbine engine. There is, therefore, a need for improved CMC material turbine components and methods for fabricating the same.

SUMMARY

The present invention is directed to a segmented component for use with a gas turbine engine. The segmented component comprises a radially extending gas path portion. The gas path portion is for interacting with gas flow from the gas turbine engine. The component is divided into axially aligned segments comprising a forward segment, an aft segment, and a plurality of middle segments disposed between the forward segment and the aft segment. The middle segments comprise radially elongate ceramic matrix composite material plates. In one embodiment, the gas path portion comprises an airfoil for a turbine blade. In another embodiment, the gas path portion comprises a removable platform for a turbine blade. In another embodiment, the gas path portion comprises an airfoil for a turbine vane.

BRIEF DESCRIPTION OF THE DRAWINGS

FIG. 3 shows an assembled view of segments from a removable CMC blade platform of FIG. 1.

FIG. 4 shows a partially exploded view of the removable CMC blade platform segments of FIG. 3.

DETAILED DESCRIPTION

Figure 1:
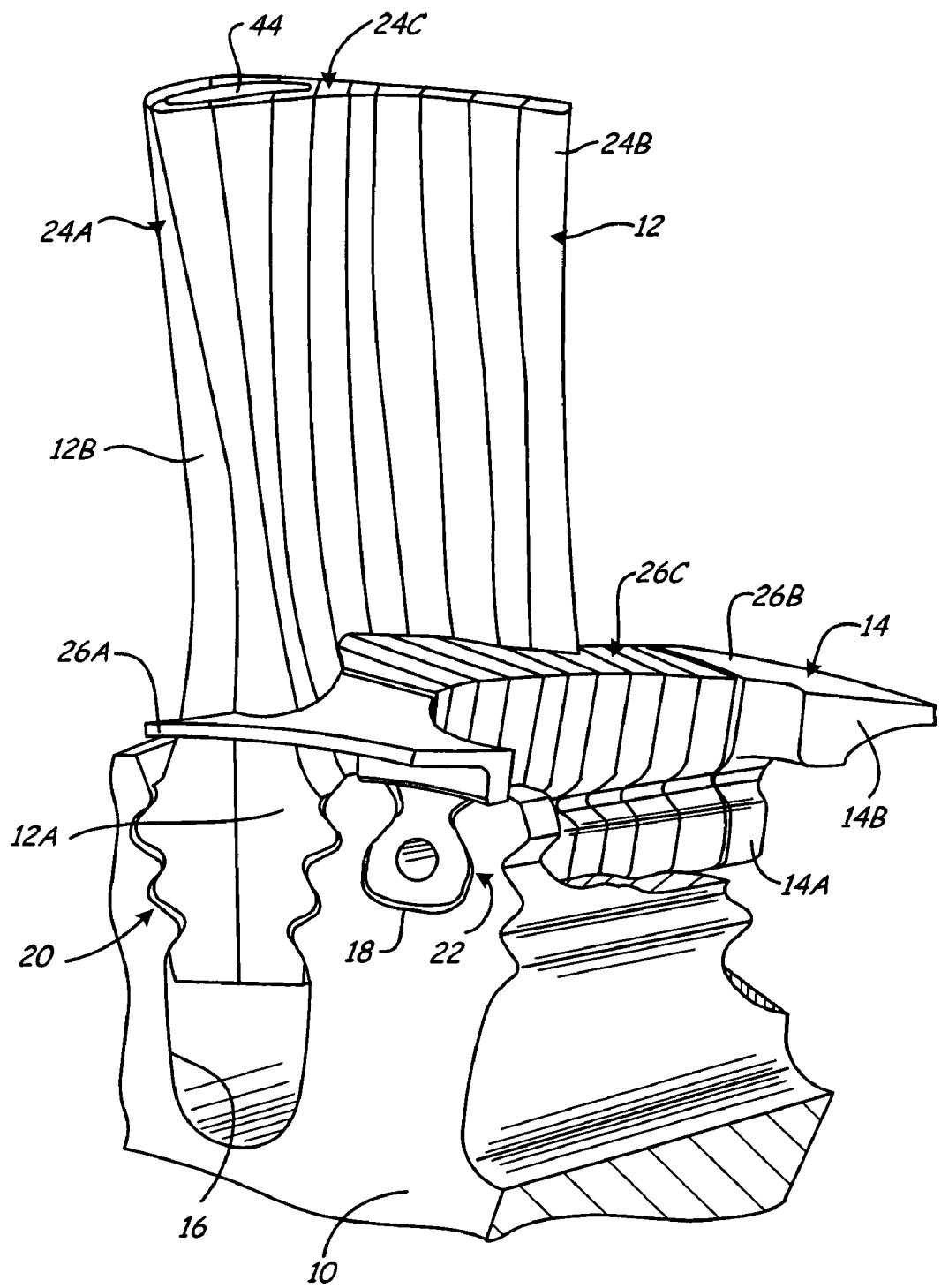
FIG. 1 shows a cut-away perspective view of a rotor disk having radial retention slots connected with segmented ceramic matrix composite (CMC) turbine blade components of the present invention.
Figure 8:
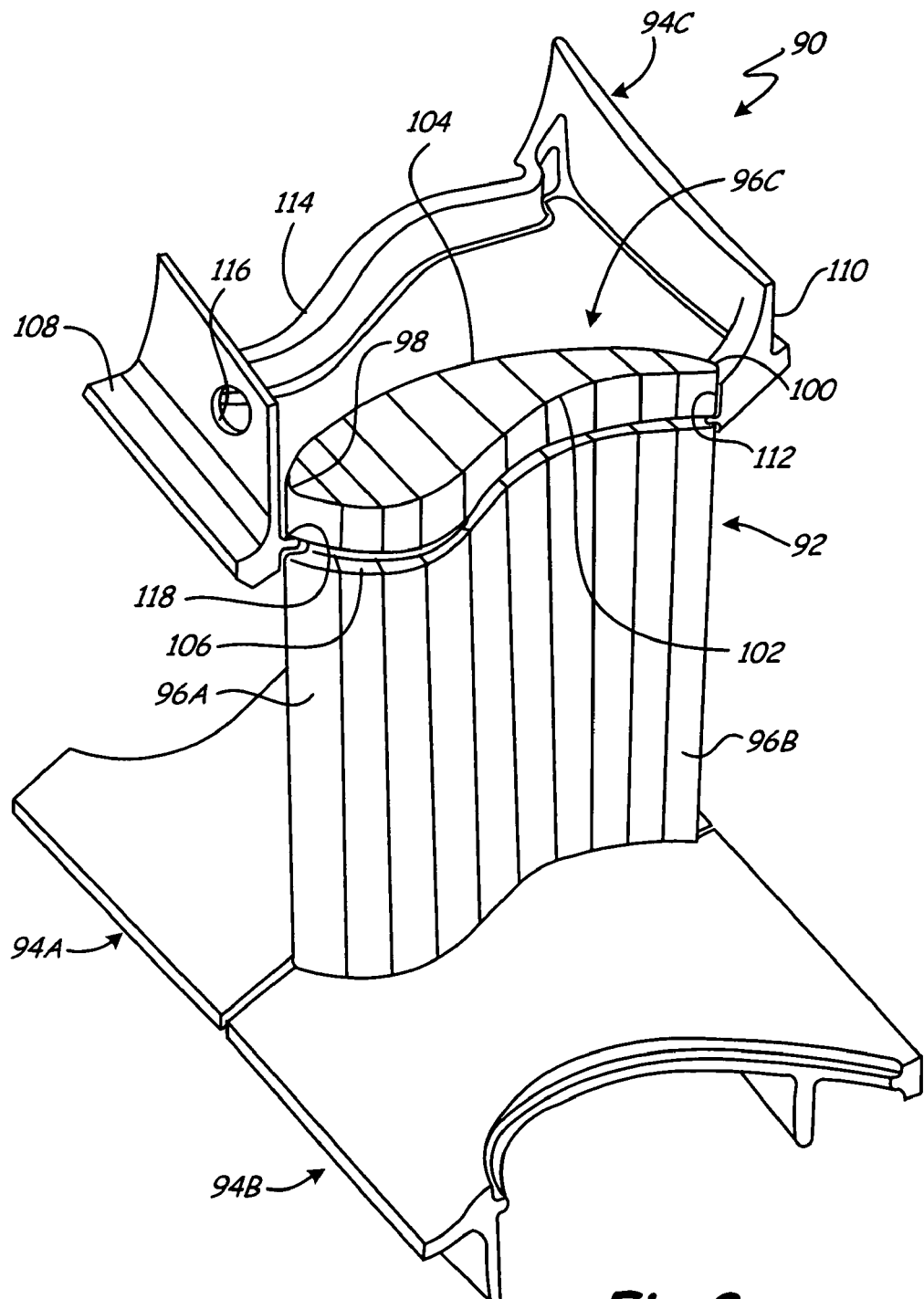
FIG. 8 shows an embodiment of a stationary segmented CMC vane having inner and outer diameter shrouds supported by a tongue and groove means.
Figure 9:
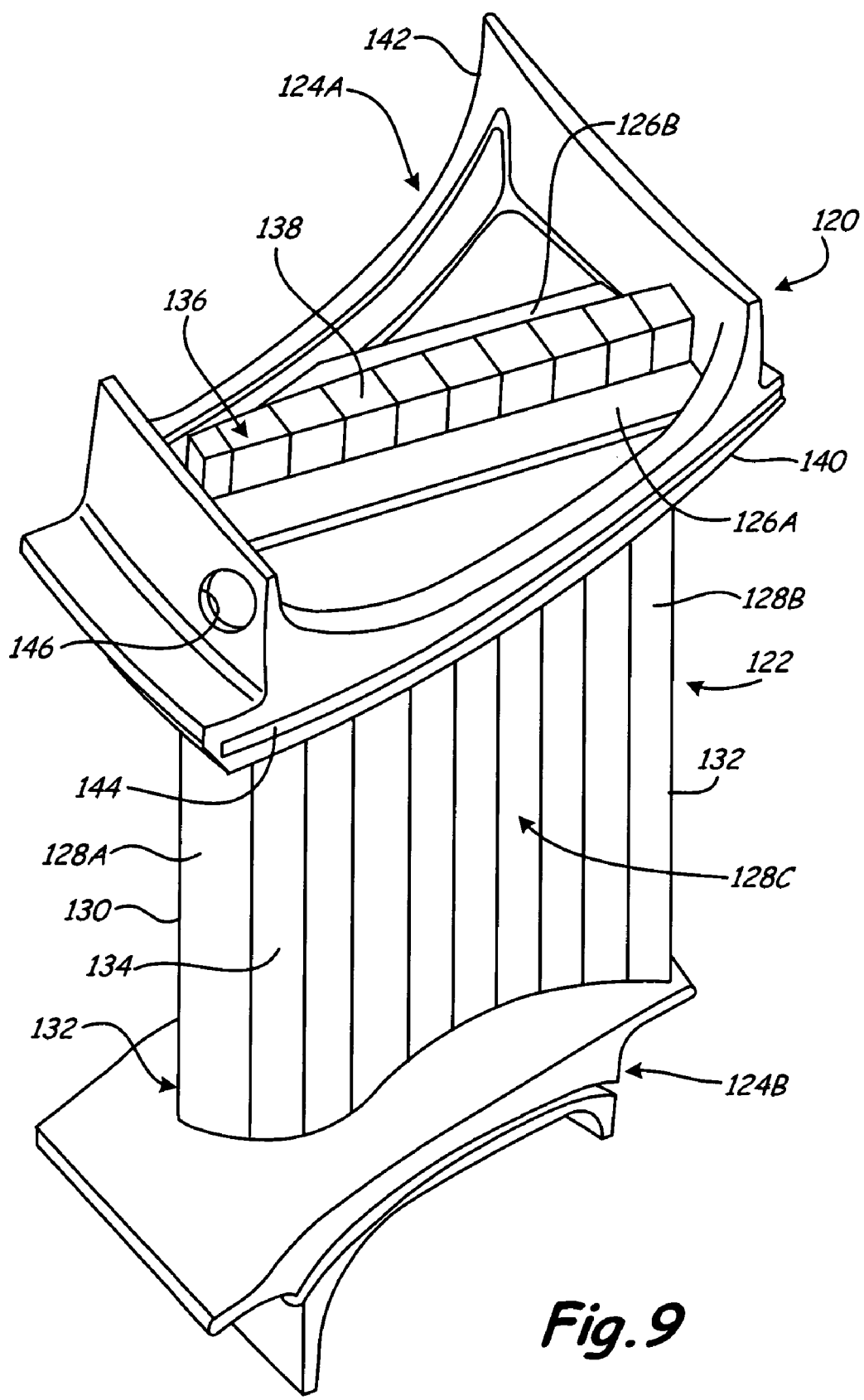
FIG. 9 shows another embodiment of a stationary segmented CMC vane having inner and outer diameter shrouds supported by retention lug means.

FIG. 1 shows a cut-away perspective view of rotor 10 connected to segmented ceramic matrix composite (CMC) material rotor blade components 12 and 14 of the present invention. Rotor 10 comprises an annular body, such as a disk, that is configured to rotate about an axial centerline within a gas turbine engine. Rotor 10 includes an inner diameter configured to be connected to a shaft in a gas turbine engine in any conventional manner, and an outer diameter configured to connect to segmented CMC blade 12 and segmented CMC platform 14 at retention slots 16 and 18, respectively. Blade 12 and platform 14 each include a root portion and a gas path portion. Specifically, blade 12 includes blade root 12A, which is connected to slot 16, and airfoil 12B. Likewise, platform 14 includes platform root 14A, which is connected to slot 18, and stage 14B. Blade 12 and platform 14 comprise one cluster of a plurality of clusters that would typically be disposed about the outer periphery of rotor 10. As such, the plurality of blades comprises an annular array of airfoils that extend from rotor 10 in a radial direction with respect to the engine centerline. The plurality of platforms comprises an annular ring that connects the plurality of airfoils and extends circumferentially around the engine centerline. In one embodiment of the invention, rotor 10 comprises a rotor disk for use in a hot section of the gas turbine engine such as in a low pressure turbine stage or a high pressure turbine stage. To enable use in high temperature environments associated with hot sections of gas turbine engines, blade 12 and platform 14 are fabricated from CMC material. As will be laid out in greater detail below, the present invention maximizes the benefits of the CMC material by first separating blade 12 and platform 14 into separate components, and then dividing each component into longitudinal segments. The CMC material is fully densified to achieve optimal heat transfer characteristics, and is oriented to achieve optimal strength characteristics. As such, the longitudinal segments of CMC material can be used in hot sections of a gas turbine engine to form various components, such as blades, platforms, vanes and shrouds. FIGS. 1-7 discuss rotary turbine components, such as blade 12 and platform 14. FIGS. 8 and 9 discuss stationary turbine components, such as vanes and shrouds.

Blade 12 and platform 14 of the present invention are produced as separate pieces to minimize angular geometries within each component that give rise to difficulties in producing CMC material components. A plurality of blades 12 and platforms 14 are individually assembled to rotor 10, after which each blade 12 is outfitted with an inner diameter shroud. Blade root 12A of blade 12 and platform root 14A of platform 14 are assembled with rotor 10 at slots 16 and 18, respectively. Platform slot 18 is positioned adjacent blade slot 16 such that an alternating pattern of slots is formed in the periphery of rotor 10. Blade slot 16 is generally larger than platform slot 18 to accommodate the greater radial forces generated by the rotation of blade 12 than the forces generated by platform 14 during rotation of rotor 10. Blade root 12A is inserted axially into slot 16 to radially restrain blade 12. Platform root 14A is inserted axially into slot 18 to radially restrain platform 14. In the embodiment shown, root 12A and slot 16 include fir tree engagement 20 in which ribs on root 12A engage channels on slot 16 that permit root 12A to be inserted into slot 16 axially, but that restrain radial movement of blade 12. In the embodiment shown, root 14A and slot 18 include dovetail engagement 22 in which hooks on slot 18 engage sidewalls of root 14A that permit root 14A to be inserted into slot 18 axially, but that restrain radial movement of platform 14. In other embodiments, blade root 12A and platform root 14A may include other radial retention configurations, such as dovetails or fir trees. Blade root 12A, platform root 14A, slot 16 and slot 18 are shaped to allow for thermal growth between roots 12A and 14A and slots 16 and 18 from heat generated during operation of the gas turbine.

Gas path portion 12B of blade 12 and gas path portion 14B of platform 14 extend from root portions 12A and 12B, respectively, to form an airfoil and an inner diameter platform. Airfoil 12B extends radially from root 12A and is shaped to include a pressure side and a suction side to extract energy to a flow of gases traveling perpendicular to blades 12. Stage 14B extends radially from root 14A and is shaped to provide a seal between a pressure side and a suction side of adjacent blades. Stage 14B seals the base of airfoil 12B and prevents gas flowing over airfoil 14B from entering slots 16 and 18. Stage 14B also prevents other fluids, such as cooling air circulated through rotor 10 from entering the flow of gas across airfoil 12B. The geometries and curvatures of the abutting surfaces of stage 14B and airfoil 12B are thus mating such that a continuous inner diameter surface is formed near the transition region between root portion 12A and airfoil portion 12B, similar to that of conventional, integral platform blades. However, the present invention splits the platforms from the airfoils along the contour of the blade, rather than splitting an integrated platform between airfoils along a straight line. The specific geometries of stage 14B and airfoil 12B are selected based on aerodynamic needs, such as the shape of the pressure and suction sides, and radial retention need, such as the shape of engagements 20 and 22. The geometries of stage 14B and airfoil 12B are, however, also selected so that they may be easily divided into thin segments to facilitate fabrication from CMC material.

Blade 12 and platform 14 are further divided into thin, radially extending CMC material segments that better align ceramic fibers within the material and that better enable infusion of a ceramic liquid into the fibers. Blade 12 is divided into segments comprising leading edge segment 24A, trailing edge segment 24B and a plurality of middle segments 24C. Platform 14 is divided into leading edge segment 26A, trailing edge segment 26B and a plurality of middle segments 26C. In the embodiment shown, blade 12 includes seven middle segments and platform 14 includes ten middle segments. In other embodiments, however, other numbers of middle segments can be used.

Figure 2:
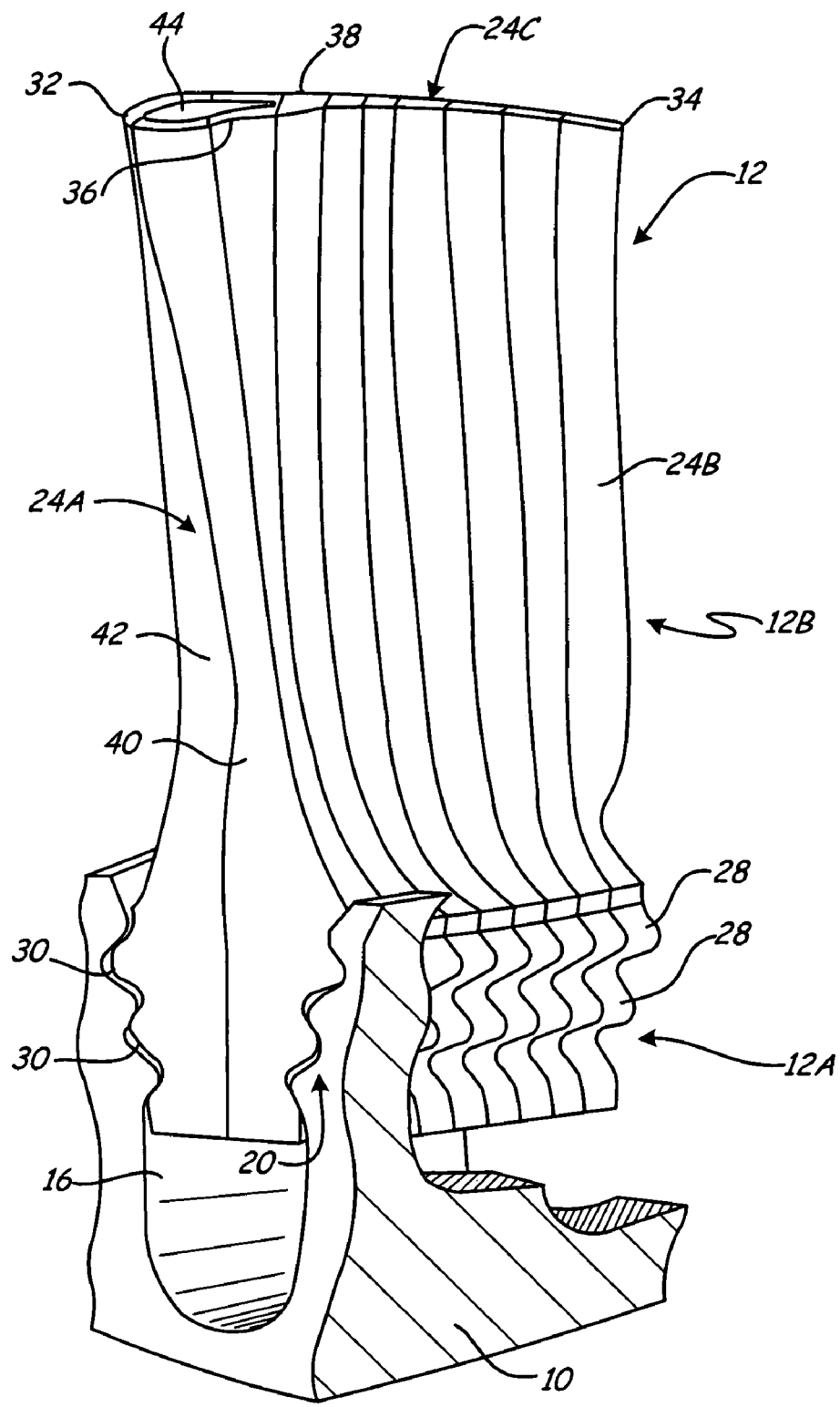
FIG. 2 shows an assembled view of segments from a removable CMC blade airfoil of FIG. 1.

FIG. 2 shows an assembled view of segments 24A-24C from removable CMC blade 12 of FIG. 1. Each segment of blade 12 includes a section of root 12A and airfoil 12B. Thus, each segment includes a gas path portion configured to impinge the hot gas of the gas turbine engine, and a radial retention portion configured to engage rotor 10. Root 12A comprises a generally uniform cross sectional area in the axial direction. As such, each segment of root 12A comprises a generally equivalent root portion. When segments 24A, 24B and 24C are axially aligned, root 12A can be axially inserted into slot 16 so that fir tree engagement 20 is properly seated. Specifically, ribs 28 of root 12A are axially seated within channels 30 of slot 16 to prevent displacement of blade 12 in the radial direction.

Airfoil 12B includes leading edge 32, trailing edge 34, concave pressure side 36 and convex suction side 38, and extends in a generally arcuate, or airfoil shape, manner in the axial direction. Airfoil 12B also extends generally radially from root 12A such that each of segments 24A, 24B and 24C include a small slice of the airfoil profile. Leading edge segment 24A includes a rounded forward surface that forms leading edge 32 and is designed to impinge an oncoming gas stream. Leading edge segment 24A also includes a planar rear surface designed to abut one of middle segments 24C. Trailing edge segment 24B includes a rounded rear surface that forms trailing edge 34 and is designed to minimize flow separation of the gas stream. Trailing edge segment 24B also includes a planar forward surface designed to abut one of middle segments 24C. Middle segments 24C include planar forward and rear surfaces so that they can be axially stacked or aligned between leading edge segment 24A and trailing edge segment 24B to complete the shape of an airfoil. The sides of middle segments 24C include small segments of pressure side 36 and suction side 38 to complete the airfoil shape. Additionally, each segment can be split into pressure side and suction side segment halves to facilitate assembly with rotor 10 and platform 14, and to produce hollow airfoils to minimize weight. For example, leading edge segment 24A includes pressure side 40 and suction side 42, which comprise mating curved segments that meet to form interior cavity 44. Interior cavity 44 can be used to provide cooling air to blade 12 or to reduce the weight of blade 12.

FIG. 3 shows an assembled view of segments 26A-26C from removable CMC blade platform 14 of FIG. 1. FIG. 4, which is discussed concurrently with FIG. 3, shows a partially exploded view of segments 26A-26C from removable CMC blade platform 14 of FIG. 3. Each segment of platform 14 includes a section of root 14A and stage 14B. Thus, each segment includes gas path portion configured to impinge the hot gas of the gas turbine engine, and a radial retention portion configured to engage rotor 10. Root 14A comprises a generally uniform cross sectional area in the axial direction. As such, each segment of root 14A comprises a generally equivalent root portion. When segments 26A, 26B and 26C are axially aligned, root 14A can be axially inserted into slot 18 so that dovetail engagement 22 (FIG. 1) is properly seated. Specifically, root 12A includes channel 46 that axially receives ribs on slot 16 (FIG. 1) to prevent displacement of platform 14 in the radial direction. Root 14A also includes assembly bore 48 that is used to axially assemble and restrain segments 26A-26C.

Stage 14B includes leading edge 50, trailing edge 52, convex side 54 and concave side 56, and extends in a generally arcuate manner in the axial direction. Stage 14B also extends generally radially from root 14A such that each of segments 26A, 26B and 26C include a small slice of the arcutate profile. Leading edge segment 26A and trailing edge segment 26B, however, also include axially and tangentially extending portions 58 and 60, respectively, that form forward and aft portions of the inner diameter shroud that encircles blades 12. Leading edge 50 and trailing edge 52 of segments 26A and 26B, respectively, are planar such that they are configured to be adjacent platforms from adjacent turbine stages. The radially outer surfaces 62 of segments 26A, 26B and 26C form a generally flat flow path that is generally perpendicular to the hot gas path. Convex side 54 has a curvature that is opposite that of pressure side 36 such that convex side 54 and pressure side 36 engage flushly when assembled with rotor 10. Likewise, concave side 56 has a curvature that is opposite that of suction side 38 such that concave side 56 and suction side 38 engage flushly when assembled with rotor 10. Middle segments 26C include planar forward and rear surfaces so that they can be axially stacked or aligned between leading edge segment 26A and trailing edge segment 26B to complete the shape of a platform.

Blade 12 and platform 14 are divided into elongate, thin segments to facilitate processing of the CMC material from which they are produced. Specifically, segments 24A-24C of blade 12 and segments 26A-26C of platform 14 are comprised of laminar layers of ceramic fibers such that the fibers provide radial tensile strength to each segment and such that each segment is properly densified with a liquid ceramic matrix. Blade 12 and platform 14 are produced from similarly configured CMC plates, the specifics of which are described with reference to middle segment 26C of platform 14 in FIGS. 5A and 5B. However, CMC plates of such a construction are suitable for use in any of segments 24A-24C and segments 26A-26C.

Figure 5A:
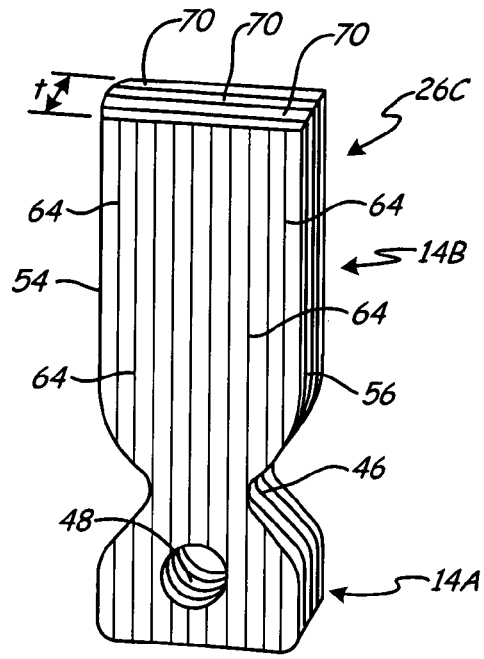
FIG. 5A shows a CMC blade platform segment of FIG. 4 fabricated from uni-directional ceramic fibers.
Figure 5B:
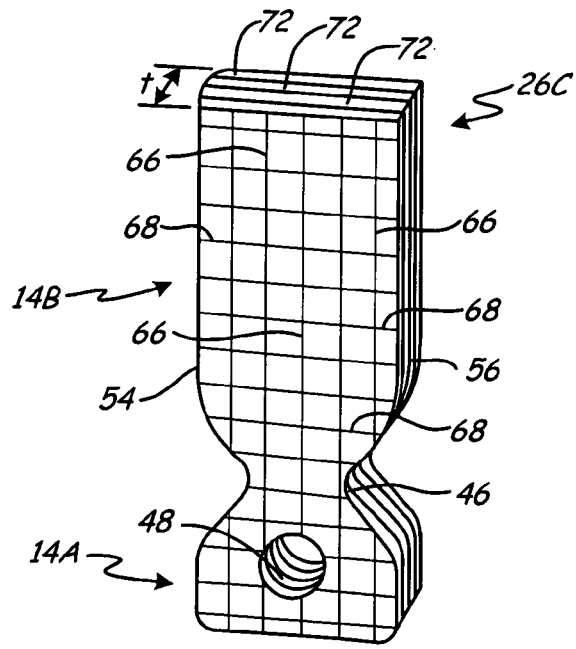
FIG. 5B shows a CMC blade platform segment of FIG. 4 fabricated from bi-directional fibers.

FIG. 5A shows one of CMC blade platform segments 26C of FIG. 4 fabricated from uni-directional ceramic fibers 64. FIG. 5B shows one of CMC blade platform segments 26C of FIG. 4 fabricated from bi-directional fibers 66 and 68. Segment 26C is comprised of a generally planar plate having through-thickness t. Through-thickness t extends generally in the axial direction when segment 26C is inserted into slot 18 (FIG. 1) of rotor 10. Each plate is comprised of ceramic fiber laminar sheets that spans root portion 14A and gas path portion 14B. In FIG. 5A, each sheet 70 is comprised of a plurality of ceramic fiber strands 64 that are provided as a uni-directional tape. In FIG. 5B, each sheet 72 is comprised of a plurality of fiber strands 66 and 68 that are provided as a bi-directional woven mesh. Fibers 64, 66 and 68 comprise long continuous strands of lightweight and high strength materials such as carbon or silicon carbide. Sheets 70 and 72 extend in a radial and tangential plane when segment 26C is inserted into slot 18 (FIG. 1) of rotor 10. Sheets 70 and 72 are infused with a matrix of liquid ceramic, such as alumina or mullite. Segment 26C is baked or heated to solidify and harden the liquid ceramic matrix into a lightweight and heat resistant ceramic solid having fibers 64-68 to provide reinforcement. Segment 26C is machined, such as with a diamond tip tool, to produce flat surfaces, curves for convex side 54 and concave side 56, and other features such as channel 46 and bore 48. Machining may take place after the liquid ceramic matrix is fully hardened or when the matrix is semi-hardened or in a green state. As such, platform 14 can be produced by individually shaping CMC plates and then assembling them to produce platform 14, or by assembling individual CMC plates and then machining them as a unitary block to produce platform 14.

Configured as such, segment 26C includes material properties suitable for use in rotary components of a turbine section of a gas turbine engine. Specifically, segment 26C has radial tensile strength capable of withstanding centrifugal forces generated by rotation of rotor 10 during operation of the gas turbine engine. For example, during operation of a gas turbine engine, turbine blades are loaded with tension and bending stresses that require maximum strength in the radial direction. Strands 64 and 66 of sheets 70 and 72, respectively, extend continuously from root portion 14A through to gas path portion 14B in the radial direction. As such, strands 64 and 66 are aligned in the direction in which segment 26C is subjected to the most stress. Furthermore, each of sheets 70 and 72 is individually connected to rotor 10 at dovetail 22. Thus, the need for further radial strength enhancement, such as radial compression means, is reduced or eliminated. Additionally, strands 64 and 66 are free from sharp bends or folds, which reduces stresses from accumulating within the typically non-compliant fibers.

The segmented nature of platform 14, however, enables different segments to include folds that facilitate production of segments having angular geometries. For example, leading edge segment 26A and trailing edge segment 26B include fibers having bends to produce platform portions 58 and 60 (FIGS. 3 and 4). However, platform portions 58 and 60 are produced with bends that are approximately ninety degrees, which avoids sharp bends that tend to produce stress concentrations. Additionally, the masses of platform portions 58 and 60 are small such that the bending stresses at the fold are minimal. Thus, platform 14 is divided into thin, plate-like segments that have ceramic fiber strands that are aligned in a preferred orientation which results in optimal tensile strength.

In various embodiments of the present invention, different components and segments can be made from CMC material or from traditional metal alloys to take advantage of different cost, weight and manufacturing benefits of each material. For example, platforms comprise approximately one quarter of the weight of each blade, while metal alloys are easier to manufacture. Thus, in one embodiment, blade 12 is made from a high strength alloy, while platform 14 is made from CMC material. Likewise, different segments of each component can be comprised of different materials. For example, leading edge segments 24A and 26A and trailing edge segments 24B and 26B can be made from metal alloys to facilitate manufacture of the more complex geometry of those parts, while middle segments 24C and 26C can be made from CMC material to save weight. Thus, each component and each segment can be made from combinations of alloy and CMC material to optimize cost, weight, strength and performance of each segment.

The thin, plate-like segments also enable the liquid ceramic matrix to be fully infused into the ceramic fibers comprising each segment. Liquid ceramic infiltration typically takes place under high pressures to enable the infused liquid to pass through multiple layers of ceramic fibers. Each ceramic fiber layer is approximately 10 to approximately 20 mils (~0.025-~0.05 cm) thick, thus requiring tens or hundreds of layers to produce parts having adequate thickness and strength. However, thick layering of the ceramic fibers, particularly at areas where the geometry changes shape such as at sharp bends that requires the ceramic matrix to change course during the infiltration, prevents the matrix from uniformly penetrating the fibers. Through-thickness t of segment 26C is selected such that the liquid ceramic matrix can penetrate the ceramic fibers to achieve a uniform density and porosity. Porosity is undesirable as it produces discontinuities in the solidified matrix that inhibits heat distribution throughout the CMC material and that provides an initiation point for crack propagation. In one embodiment of the invention, each segment has a maximum thickness of approximately 0.25 inches (~0.64 cm). Different segments may have different thicknesses to provide more or less radial strength at different positions along the axial length of platform 14 or to obtain a desired overall axial length of platform 14. Flat-plate construction also has other benefits as is known in the art, such as reduction in anisotropic shrinkage, reduction of delamination flaws, and dimensional control.

Figure 6:
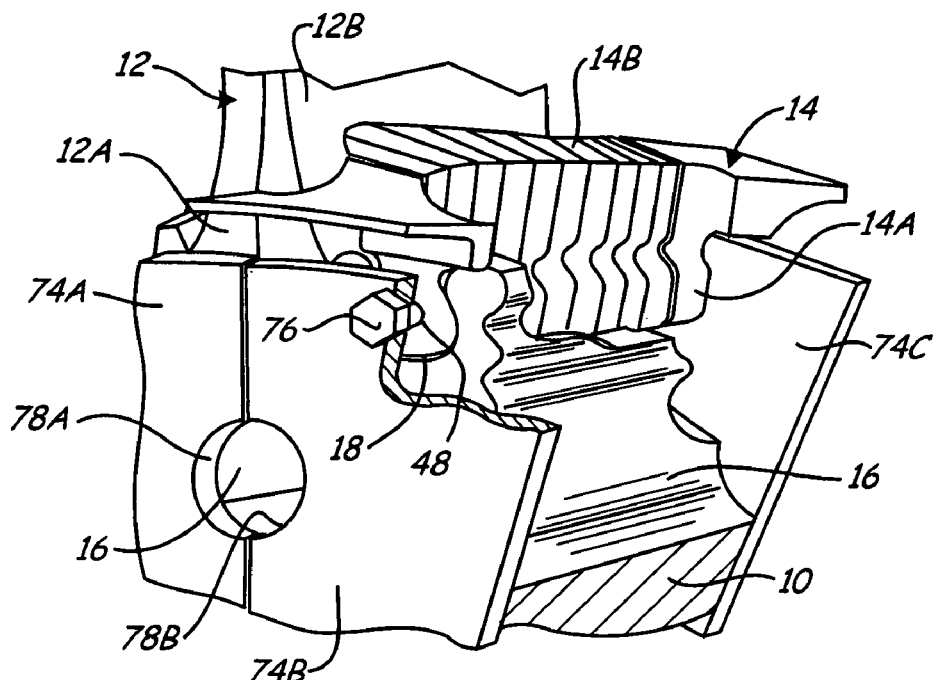
FIG. 6 shows a partially cut away view of an embodiment of a retention mechanism for use with the removable segmented CMC blade platform of FIGS. 3 and 4.

FIG. 6 shows a partially cut away view of an embodiment of a retention mechanism for use with removable CMC blade platform 14 of FIGS. 3 and 4. Blade 12 and platform 14 are seated within slots 16 and 18, respectively, such that pressure side 36 (FIG. 2) of blade 12 flushly abuts convex side 54 (FIG. 3) of platform 14. Forward retention plates 74A and 74B and aft retention plate 74C axially restrain blade 12 and platform 14 within slots 16 and 18. Segments 26A-26C are preassembled in an axial stack using a glue or adhesive such that platform 14 can be inserted into slot 18 of rotor 10. The glue temporarily holds segments 26A-26C together to facilitate assembly of cover plates 74A, 74B and 74C with rotor 12 using fastener 76. The glue ultimately burns off during operation of the gas turbine engine.

Each retention plate comprises a segment of an annular ring that, when assembled, has an outer diameter that is positioned just below the outer extents of slots 16 and 18, and an inner diameter that is positioned just below the troughs of slots 16. Retention plates 74A, 74B and 74C are secured to rotor 10 using fastener 76, which is extended through bores within plates 74B and 74C and bore 48 within platform root 14A. Fastener 76 directly compresses segments 26A-26C between plates 74B and 74C to keep segments 26A-6C axially assembled to each other, and to keep root 14A axially restrained within slot 18. Retention plates 74B and 74C also extend tangentially away from slot 18 to cover portions of adjacent slots 16. Retention plates 74B and 74C therefore also provide compressive forces to blade root 12A to maintain assembly and to provide axial restraint. Secured as such, the retention plates prevent roots 12A and 14A from moving axially within slots 16 and 18.

The retention plates also control air flow through slots 16 and 18 of rotor 10. For example, retention plates 74A and 74B include cut-outs 78A and 78B, which form an opening to permit cooling air into slot 16. Thus, the retention plates prevent cooling air from passing through rotor 10 between root 12A and slot 16 and root 14A and slot 18, but permit cooling air to pass underneath root 12A of blade 12 so as to be able to enter any cooling passages extending through airfoil 12B and root 12A, such as cavity 44 (FIG. 2).

Figure 7:
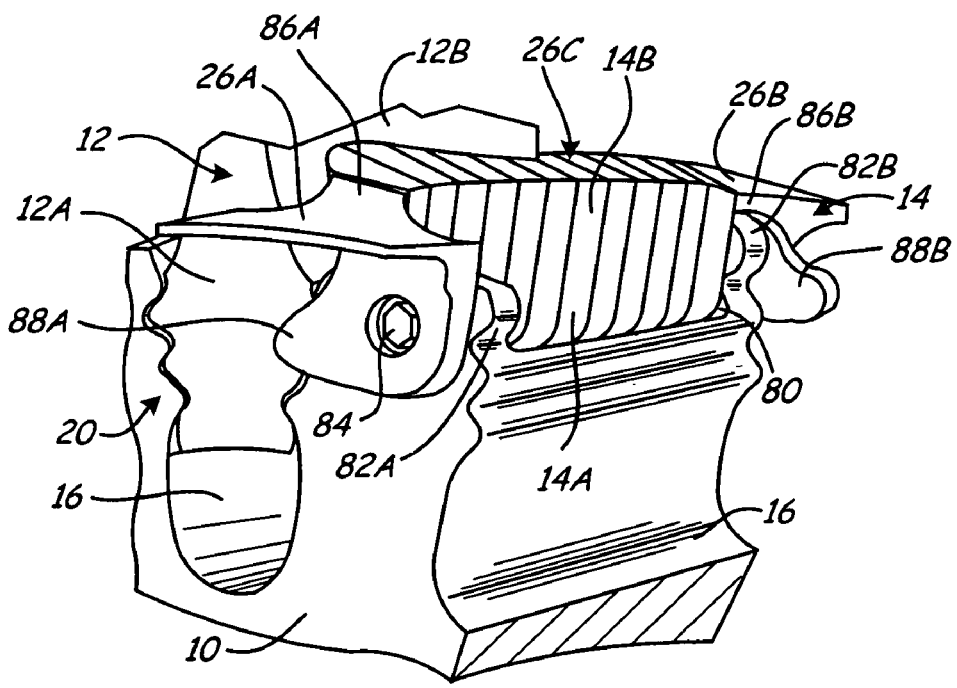
FIG. 7 shows another embodiment of a retention mechanism for use with a removable CMC blade platform of the present invention.

FIG. 7 shows another embodiment of a retention mechanism for use with removable CMC blade platform 14 of the present invention. In the embodiment of FIG. 7, slot 18 of FIG. 6 is replaced with slot 80 and radial flanges or tabs 82A and 82B. Slot 80 comprises a tangential slot between tabs 82A and 82B and extends clear through to adjacent slots 16. Slot 80 and middle segments 26C are not provided with a radial retention engagement, such as a dovetail, but are rather radially restrained by fastener 84. Fastener 84 extends through leading edge segment 26A, tab 82A, middle segments 26C, tab 82B and trailing edge segment 26B to maintain axial assembly of segments 26A-26C and to radially restrain platform 14. Because of tabs 82A and 82B, fastener 84 does not provide direct compression to middle segments 26C. Leading edge segment 26A and trailing edge segment 26B are, however, provided with axial tabs 86A and 86B, respectively, which compress middle segments 26C when fastener 84 is put in tension. Axial tabs 86A and 86B extend axially from gas path portions 14B of segments 26A and 26B to span the gaps produced by radial tabs 82A and 82B between segments 26A and 26B and middle segments 26C, respectively. Segments 26A and 26B also include tabs or wings 88A and 88B, which extend tangentially from root portions 14A to provide axial restraint to adjacent blade roots 12A. For example, leading edge segment 26A includes wing 88A that provides forward axial restraint to blade 12, and trailing edge segment 26B includes wing 88B that provides rearward axial restraint to a tangentially opposite adjacent blade. However, in other embodiments, segments 26A and 26B may include any combination of forward, rearward and tangentially opposing blade retention wings. Blade 12 is individually radially restrained by a radial retention engagement such as fir tree engagement 20. Assembled as such, leading edge segment 26A, trailing edge segment 26B and fastener 84 provide axial retention to both blade 12 and platform 14, and a continuous ring of axial retention plates are not needed.

The CMC segments of the present invention allow for directional alignment of reinforcing fibers so that material strength properties can be matched to performance needs. Furthermore, the matrix material is uniformly infused into the reinforcing fibers to achieve maximum heat transfer properties as well as to avoid weaknesses associated with porosity. Thus, CMC segmented components are highly suitable for use as rotary components in a gas turbine engine, as is described with respect to FIGS. 1-7, where light weight, heat resistance and high radial strength is desirable. Additionally, CMC segmented components are highly suitable for use in stationary components within gas turbine engines.

FIG. 8 shows an embodiment of a stationary segmented CMC vane. Stationary CMC segmented vane 90 comprises airfoil 92 and split shrouds 94A, 94B and 94C. Vane 90 and shrouds 94A, 94B and 94C are produced as separate pieces such that each piece can be produced from materials and with methods that result in optimal performance. In one embodiment, airfoil 92 is formed from CMC material segments to enhance strength, heat and weight capabilities of airfoil 92, and shrouds 94A-94C are cast from high strength alloys for ease of manufacture. A plurality of vanes 90 and shrouds are assembled to form an array of stationary vanes disposed circumferentially about a centerline of a gas turbine engine. For example, each vane 90 would be positioned adjacent a pair of inner diameter shrouds 94A and 94B, and a pair of outer diameter shrouds 94C. Thus, for each vane in the array, there is a corresponding inner and outer diameter shroud.

Airfoil 92 is divided into CMC segments including leading edge segment 96A, trailing edge segment 96B and a plurality of middle segments 96C. In the embodiment shown, airfoil 92 includes eight middle segments 96C. As is described with respect to segment 26C of FIG. 5A, segments 96A-96C are formed of thin layers of reinforcing fibers having a thickness such that the fibers can be completely infused with a ceramic matrix composite material. Additionally, the fibers are radially oriented such that segments 96A-96C have high tensile strength. Airfoil 92 and shrouds 94A, 94B and 94C are shaped to allow for thermal growth between segments 96A, 96B and 96C and shrouds 94A, 94B and 94C from heat generated during operation of the gas turbine engine. In other embodiments, leading edge segment 96A and trailing edge segment 96B are comprised of a metal alloy material.

Airfoil 92 is configured to impinge hot gas in a gas turbine engine and includes leading edge 98, trailing edge 100, concave pressure side 102 and convex suction side 104. Airfoil 92 extends in a generally arcuate, or airfoil shape, manner in the axial direction. Airfoil 92 also extends generally radially from inner diameter shrouds 94A and 94B to outer diameter shroud 94C such that each of segments 96A, 96B and 96C includes a small slice of the profile of airfoil 92. Leading edge segment 96A includes a rounded forward surface that forms leading edge 98 and is designed to impinge an oncoming gas stream. Leading edge segment 96A also includes a planar rear surface designed to abut one of middle segments 96C. Trailing edge segment 96B includes a rounded rear surface that forms trailing edge 100 and is designed to minimize flow separation of the gas stream. Trailing edge segment 96B also includes a planar forward surface designed to abut one of middle segments 96C. Middle segments 96C include planar forward and rear surfaces so that they can be axially stacked or aligned between leading edge segment 96A and trailing edge segment 96B to complete the shape of an airfoil. The sides of middle segments 96C include small segments of pressure side 102 and suction side 104 to complete the airfoil shape. Additionally, each segment can be split into pressure side and suction side segment halves to facilitate assembly with shrouds 94A-94C, and to produce hollow airfoils to minimize weight, as is done with blade 12 of FIG. 2. Airfoil 92 also includes groove 106 such that segments 96A-96C can be assembled with shrouds 94A-94C. Groove 106 can be machined into segments 96A-96C or can be cast into the CMC segments.

Shrouds 94A-94C are comprised of metal alloys to facilitate manufacturing of the complex shapes of shrouds 94A-94C. Shrouds 94A-94C are shaped to seal between adjacent airfoils 92. The shrouds prevent hot gas that flows over airfoil 92 from leaking into the gas turbine engine and maintain hot gases flowing axially through stages of vanes and blades in the gas turbine engine. For example, shroud 94C includes leading edge side 108, trailing edge side 110, pressure side 112 and suction side 114. Leading edge side 108 and trailing edge side 110 include flanges that can be mounted to a casing structure in a gas turbine engine. For example, leading edge side 108 includes hole 116 through which a threaded fastener can be extended to secure shroud 94C to a casing structure. Pressure side 112 and suction side 114 have contours that match pressure side 102 and suction side 104 of airfoil 92, respectively. Additionally, leading edge side 108 and trailing edge side 110 abut at leading edge 98 and trailing edge 100, respectively, such that a continuous hoop-shaped shroud structure is formed. Pressure side 112 and suction side 114 each also include a lip from which airfoil 92 is suspended. For example, suction side 112 includes lip 118 that is inserted into groove 106 along suction side 104 of airfoil 92. Outer diameter shrouds 94C are connected together, such as with fasteners, to form a rigid structure that supports the outer diameter ends of airfoils 92. As outer diameter shrouds 94C are connected to a casing structure, segments 96A, 96B and 96C are clamped between outer diameter shroud segments.

Segments 96A-96C are preassembled in an axial stack using a glue or adhesive such that airfoil 92 can be connected with outer and inner diameter shrouds. The glue temporarily holds segments 96A-96C together to facilitate assembly of the shrouds. The glue ultimately burns off during operation of the gas turbine engine. In other embodiments, a threaded fastener is positioned within a bore extending through segments 96A-96C either radially inward of inner diameter shrouds or radially outward of outer diameter shrouds. Inner diameter shroud segments, such as shrouds 94A and 94B, are connected to inner diameter ends of airfoils 92 using a similar lip and groove system as is used with outer diameter shrouds 94C. The inner diameter shroud segments are connected to each other using, for example, threaded fasteners to provide a rigid structure that supports the inner diameter ends of airfoils 92. The assembled inner diameter shroud is then supported by another support structure, such as by a sealing system or a cooling system supported by a bearing surrounding the shaft of the gas turbine engine.

FIG. 9 shows another embodiment of a stationary segmented CMC vane. Stationary CMC segmented vane 120 comprises airfoil 122, split shrouds 124A and 124B, and retention tabs 126A and 126B. Stationary vane 120 functions similar to that of stationary vane 90 of FIG. 8 in that shrouds 124A and 124B support airfoil 122 within a gas turbine engine in a stationary manner. Airfoil 122 and shrouds 124A and 124B are fabricated as separate pieces such that each can be made to perform optimally. For example, shrouds 124A and 124B are fabricated from alloy materials for ease of manufacture and for strength. Airfoil 122 is comprised of CMC segments 128A, 128B and 128C. Segments 128A-128C are shaped and formed using similar methods as are used to produce segments 96A-96C of FIG. 8 and segment 26C of FIG. 5A. The outer and inner diameter ends of airfoil 122 are, however, shaped differently to interact with shrouds 124A and 124B.

Airfoil 122 is shaped to impinge hot gas within a gas turbine engine and includes leading edge 130, trailing edge 132, pressure side 134 and a suction side (not visible in FIG. 9), that form an airfoil shape. Segments 128A-128C include planar forward and rear surfaces that permit segments 128A-128C to be stacked axially. Leading edge segment 128A includes leading edge 130, and trailing edge segment 128B includes trailing edge 132, which include rounded surfaces for aerodynamic flow purposes. Middle segments 128C include curved surfaces that form pressure side 134 and the suction side when stacked. Outer diameter end 136 includes retention lug 138 that interacts with retention tabs 126A and 126B to secure airfoil 122 to outer diameter shroud 124A. Similarly, the inner diameter end of airfoil 122 interacts with a pair of retention tabs radially inward of inner diameter shroud 124B.

Shrouds 124A and 124B perform similar functions to that of shrouds 94A-94C of FIG. 8, but, rather than filling gaps between adjacent airfoils, surround an end of an airfoil such that each shroud contacts only one airfoil. Specifically, shroud 124A engages only outer diameter end 136 of one airfoil 122, but contacts two identical shrouds at pressure side wall 140 and suction side wall 142. Side walls 140 and 142 are generally planar such that the walls abut flush with adjacent shrouds. Side walls 140 and 142 also include slots for receiving feather seals. For example, pressure side 140 includes slot 144 that receives a thin sheet metal-like piece that extends into a slot on an adjacent shroud to inhibit air from escaping the gas path along airfoils 122 within a gas turbine engine. Shrouds 124A and 124B are conventionally mounted within the gas turbine engine, such as by using bore 146 and threaded fasteners. As such, shrouds 124A and 124B connect with other shrouds to form rigid hoop-like structures for supporting airfoils 122. Shrouds 124A and 124B, however, include axially extending openings for engaging retention lug, such as retention lug 138, of airfoil 122.

Figure 10:
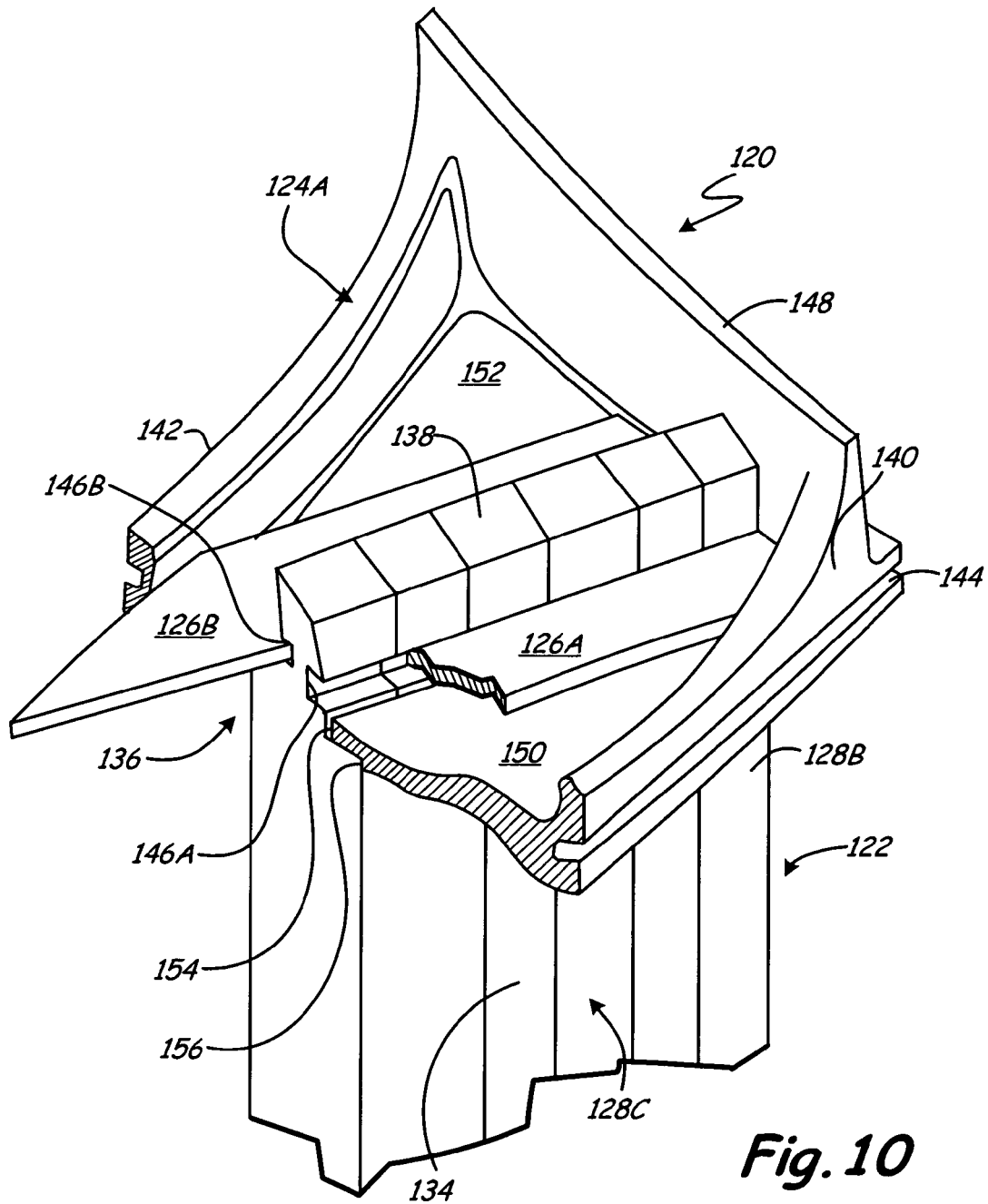
FIG. 10 shows a cut away view of the stationary segmented CMC vane of FIG. 9 showing a retention lug interacting with retention tabs at an outer diameter shroud.

FIG. 10 shows airfoil 122, outer diameter vane shroud 124A and retention tabs 126A and 126B of vane 120. Vane shroud 124A and retention tab 126A are broken away to show the interaction of airfoil 122 with retention tabs 126A and 126B. Additionally, leading edge segment 128A and a portion of middle segments 128C are omitted from FIG. 10. Outer diameter end 136 of airfoil 122 includes retention lug 138, which includes pressure side groove 146A and suction side groove 146B. Shroud 124A includes pressure side wall 140, suction side wall 142, seal slot 144, trailing edge wall 148, pressure side floor 150, suction side floor 152 and opening 154.

Opening 154 extends generally diagonally across shroud 124A to separate pressure side floor 150 from suction side floor 152. Opening 154 extends across the length of shroud 124A between trailing edge wall 148 and a corresponding leading edge wall (not shown). Thus, floors 150 and 152 comprise generally triangular shaped segments that are bordered by walls 140, 142 and 148 and opening 154. Retention lug 138 comprises a generally rectangular projection that extends from the distal, or radially outer, surfaces of the portions of CMC segments 128A-128C forming airfoil 122. Retention lug 138 is integrally cast in CMC segments 128A-128C to preserve the radial integrity and strength of airfoil 122. Lug 138 has the same general shape and size, or cross section, of opening 154 such that lug 138 fits tightly into opening 154. Pressure side groove 146A and suction side groove 146B are positioned along lug 138 at a specified distance above the distal surfaces of CMC segments 128A-128C that form airfoil 122. The distance generally corresponds to a thickness of floors 150 and 152. Grooves 146A and 146B comprise generally C-shaped channels that have flat radially inner surfaces and outer surfaces that define a channel height. The channel height generally corresponds to the thickness of retention tabs 126A and 126B.

When lug 138 is inserted into opening 154, floors 150 and 152 will rest on the radial outer surfaces of segments 128A-128C comprising airfoil 122. Floors 150 and 152 include notches such that shroud 124A can be fitted onto segments 128A-128C while lug 138 is fitted into opening 154. For example, floor 150 includes notch 156 that traces the contour of pressure side 134 of airfoil 122. The radially inner surfaces of grooves 146A and 146B are generally coplanar with the radially outer surfaces of floors 150 and 152, respectively. The radially outer surfaces of grooves 146A and 146B are generally coplanar with the radially outer surfaces of retention tabs 126A and 126B, when retention tabs 126A and 126B rest on floors 150 and 152. With retention tabs 126A and 126B resting on floors 150 and 152, retention tabs 126A and 126B can be inserted into grooves 146A and 146B, respectively. Retention tabs 126A and 126B have thicknesses that fill grooves 146A and 146B such that tabs 126A and 126B are tightly fitted. Retention tabs 126A and 126B have widths that allow tabs 126A and 126B to extend completely into grooves 146A and 146B as well as to overhang floors 150 and 152. Retention tabs 126A and 126B have lengths that extend from trailing edge wall 148 to the corresponding leading edge wall. As such, retention tabs 126A and 126B have a general parallelogram shape that permits each tab to fit between lug 138, side walls 140 and 142, trailing edge wall 148 and the corresponding leading edge wall. With retention tabs 154A and 154B seated in grooves 146A and 146B and resting on floors 150 and 152, respectively, airfoil 122 is restrained from moving either radially inward or radially outward with respect to shroud 124A. Retention tabs 126A and 126B are welded in place, or otherwise secured, to prevent dislodgement. Inner diameter shroud 124B (FIG. 9) is assembled to airfoil 122 in a similar fashion. Shrouds 124A and 124B are connected to airfoil 122 such that vanes 120 can be subsequently installed into a gas turbine engine.

Thus, thin segments of CMC material can be shaped and stacked to form larger components having more complex shapes. The thin segments of CMC material allow the ceramic matrix material to be properly infused into reinforcing fibers to gain the full benefit of the ceramic matrix. The thin segments also allow the reinforcing fibers to be aligned in a direction that will provide maximum strength to the assembled component. The components can then be used in high heat, high stress environments where weight limitations are of concern. For example, CMC segments of the present invention can be shaped and assembled to form various components for a hot section of a gas turbine engine, such as blades, vanes, platforms and shrouds.

Although the present invention has been described with reference to preferred embodiments, workers skilled in the art will recognize that changes may be made in form and detail without departing from the spirit and scope of the invention.

The invention claimed is:

1. A segmented component for a gas turbine engine, the component comprising:
   a gas path portion for interacting with gas flow from the gas turbine engine; and
   a root portion extending radially inwardly from the gas path portion, the root portion having a geometry for providing radial retention with a rotor of the gas turbine engine;
   wherein the component is divided into axially aligned segments comprising:
      a forward platform segment having contours configured to flushly abut leading edge portions of adjacent airfoils;
      an aft platform segment having contours configured to flushly abut trailing edge portions of adjacent airfoils; and
      a plurality of middle platform segments disposed between the forward segment and the aft segment, the plurality of middle segments comprising radially elongate ceramic matrix composite material plates having contours configured to abut a suction side and a pressure side of adjacent airfoils; and wherein the forward and the aft platform segments are comprised of plates of ceramic matrix composite material having a bend to form a radially extending portion forming the root portion and an axially extending portion forming the gas path portion, the axially extending portion being axially forward or aft of the radially extending portion.

2. The segmented component of claim 1 wherein each of the segments are comprised of ceramic fiber and have a thickness such that an entirety of the fiber can be nearly uniformly infiltrated with a ceramic matrix liquid to reduce porosity within the component.

3. The segmented component of claim 2 wherein each of the plurality of middle segments are comprised of ceramic matrix composite plates having an axial thickness up to approximately 0.25 inches (~0.635 cm).

4. The segmented component of claim 1 wherein each of the segments is comprised of a ceramic matrix composite plate having fabric mesh fibers extending in a radial and tangential plane with respect to a centerline of the gas turbine engine.

5. The segmented component of claim 1 wherein each of the segments is comprised of a ceramic matrix composite plate having fibers extending continuously through the root portion and the gas path portion.

6. The segmented component of claim 5 wherein the root portion further includes an axial retention bore for receiving a retention bolt.

7. The segmented component of claim 6 wherein the geometry of the root portion comprises a dovetail or fir-tree configuration.

8. The segmented component of claim 1 wherein the forward segment or the aft segment of the root portion includes a tangentially extending flange for axially restraining a root portion of an adjacent rotor component connected to an outer periphery of the rotor.

9. The segmented component of claim 1 wherein the forward and aft platform segments each further include an axial extending retention tab for abutting one of the plurality of middle segments.

10. The segmented component of claim 1 wherein the forward and the aft platform segments are comprised of fabric mesh fibers that extend across the radial extending portion, the bend and the axial extending portion.

11. A segmented component for a gas turbine engine, the component comprising:
a gas path portion for interacting with gas flow from the gas turbine engine; and
a root portion extending radially inwardly from the gas path portion, the root portion having a geometry for providing radial retention with a rotor of the gas turbine engine;
wherein the component is divided into axially aligned segments comprising:
a forward platform segment having contours configured to flushly abut leading edge portions of adjacent airfoils;
an aft platform segment having contours configured to flushly abut trailing edge portions of adjacent airfoils; and
a plurality of middle platform segments disposed between the forward segment and the aft segment, the plurality of middle segments comprising radially elongate ceramic matrix composite material plates having contours configured to abut a suction side and a pressure side of adjacent airfoils; and
wherein the forward segment or the aft segment includes a flange extending tangentially from the root portion and configured to be positioned forward or aft of a root portion of an adjacent rotor component connected to an outer periphery of the rotor to axially restrain the adjacent rotor component.

12. The segmented component of claim 11 wherein the forward segment and the aft segment are comprised of a metal alloy material.

13. A segmented component for a gas turbine engine, the component comprising:
a gas path portion for interacting with gas flow from the gas turbine engine; and
a root portion extending radially inwardly from the gas path portion, the root portion having a geometry for providing radial retention with a rotor of the gas turbine engine;
wherein the component is divided into axially aligned segments comprising:
a forward platform segment having contours configured to flushly abut leading edge portions of adjacent airfoils;
an aft platform segment having contours configured to flushly abut trailing edge portions of adjacent airfoils; and
a plurality of middle platform segments disposed between the forward segment and the aft segment, the plurality of middle segments comprising radially elongate ceramic matrix composite material plates having contours configured to abut a suction side and a pressure side of adjacent airfoils; and
wherein the forward and aft platform segments each further include an axial extending retention tab for abutting one of the plurality of middle segments.

14. The segmented component of claim 13 wherein the forward segment and the aft segment are comprised of a metal alloy material.

* * * * *